United States Patent [19]
Williams et al.

[11] Patent Number: 5,536,042
[45] Date of Patent: Jul. 16, 1996

[54] VEHICLE BUNK AND OCCUPANT RESTRAINT SYSTEM

[75] Inventors: Jeffry L. Williams, Zionsville; Keith H. Freeman, Cicero; Giuliano Cacucci, Carmel, all of Ind.

[73] Assignee: Indiana Mills and Manufacturing, Inc., Westfield, Ind.

[21] Appl. No.: 422,837

[22] Filed: Apr. 17, 1995

[51] Int. Cl.⁶ ............................................. B60R 21/06
[52] U.S. Cl. ............................. 280/749; 297/487; 5/118
[58] Field of Search ........................... 280/748, 749; 297/487, 464; 296/24.1, 190; 410/117, 118; 5/424, 426, 94, 118

[56] References Cited

U.S. PATENT DOCUMENTS

| | | | |
|---|---|---|---|
| 1,959,974 | 5/1934 | Westgate | 280/749 |
| 2,706,819 | 4/1955 | McClure | 280/749 |
| 3,695,698 | 10/1972 | Trump | 297/487 |
| 4,141,093 | 2/1979 | Marsden | 5/9.1 |
| 4,630,324 | 12/1986 | Fllligsten et al. | 280/749 |
| 5,375,879 | 12/1994 | Williams et al. | 280/749 |

*Primary Examiner*—Paul N. Dickson
*Attorney, Agent, or Firm*—Woodard, Emhardt, Naughton, Moriarty & McNett

[57] ABSTRACT

A vehicle bunk and occupant restraint system. A bunk frame is pivotally or fixedly mounted to the back wall of the sleeping compartment of a trailer-cab. A fabric net has a proximal end fixedly mounted to the back wall and a distal end having buckles mounted thereto and positioned at the distal end of the bunk frame. A web support has a proximal end fixedly mounted to the back wall. The distal end of the web support includes a plurality of tongues positioned at the distal end of the bunk frame lockingly engagable with the buckles limiting occupant movement and application of occupant inertial force to the bunk frame during an emergency stop.

14 Claims, 4 Drawing Sheets

VEHICLE BUNK AND OCCUPANT RESTRAINT SYSTEM

BACKGROUND OF THE INVENTION

1. Field of the Invention

This invention is in the field of occupant restraint systems for limiting movement of a reclining occupant within a vehicle.

2. Description of the Prior Art

Semi-trailer cabs include sleeping compartments for use by non-driving occupants. Federal regulations require that restraints be provided for use while utilizing the sleeper compartment with the vehicle in motion. Industry standards recommend the bunk restraint strap/net buckles on sleeper equipment be mounted on the entrance side of the sleeper compartment.

Disclosed herein is a restraint system having a net mounted to the compartment back wall and extendable over the occupant reclining on the bunk. The restraint system further includes a support extendable beneath and adjacent the bunk mattress with the outer ends of the support and net including matching locking devices thereby limiting motion of the occupant atop the bunk while allowing easier entrance and egress by utilizing the opening provided by distal locking devices.

Harnesses or nets are available to limit movement of a reclining occupant during an emergency stop. Three such web or net constructions for use with a bed are disclosed in the U.S. Pat. No. 3,695,698 issued to Trump, U.S. Pat. No. 4,141,093 issued to Marsden and U.S. Pat. No. 5,375,879 issued to Williams and Freeman. The Marsden harness is attached to the forward edge of the bunk and then extends upwardly to a spring biased reel mounted in the compartment ceiling. The web restrains the occupant with the support of the bunk. The bunk utilized with the Marsden harness must be relatively strong since the harness is attached to the forward edge of the bunk, thereby applying inertial forces directly thereto as a result of the occupant moving forwardly during an emergency stop. The Williams and Freeman restraint system includes a net fixedly mounted to a web framework which in turn is slidably mounted to webs extendable and retractable by retracting devices. What is needed and disclosed herein is a harness system which will limit motion of the occupant and mattress while not necessitating an exceptionally strong bunk construction thereby providing for an inexpensive combination of bunk and harness.

SUMMARY OF THE INVENTION

One embodiment of the present invention is in a restraint system for a reclining occupant in a vehicle comprising a bed including a bunk with a proximal end mounted to the vehicle and having a bunk distal end. The bed further includes a pad resting atop the bunk upon which a occupant may recline in the vehicle. A net has a net proximal end mounted to the vehicle and further has a net distal end. The net extends from the net proximal end over the bed to the net distal end. A support has a support proximal end mounted to the vehicle and further has a support distal end. The support extends from the support proximal end between the bunk and pad to the support distal end. A first lock is mounted to the net distal end and a second lock is mounted to the support distal end and when locked together holds the net over and restrains the occupant reclining on the bed and holds the support beneath and against the pad limiting movement of the pad while limiting application of occupant inertial force to the bunk during an emergency stop.

It is an object of the present invention to provide a new and improved restraint system for limiting motion of a reclining occupant within a sleeping compartment during an emergency stop.

A further object of the present invention is to provide a restraint system which limits application of inertial force to a vehicle bunk structure by a reclining occupant during an emergency stop and instead directs the force through the perimeter of the restraint to the structure of the sleeper compartment.

A further object of the present invention is to provide a vehicle compartment restraint system minimizing openings in the restraint through which the occupant otherwise might slip during an emergency stop.

A further object of the present invention is to provide a restraint which promotes use through convenience of function and stowage by having it fixed at the rearmost portion while utilizing locking devices at the distal end.

Related objects and advantages of the present invention will be apparent in the following description.

DESCRIPTION OF THE PREFERRED EMBODIMENT

Figure 1:
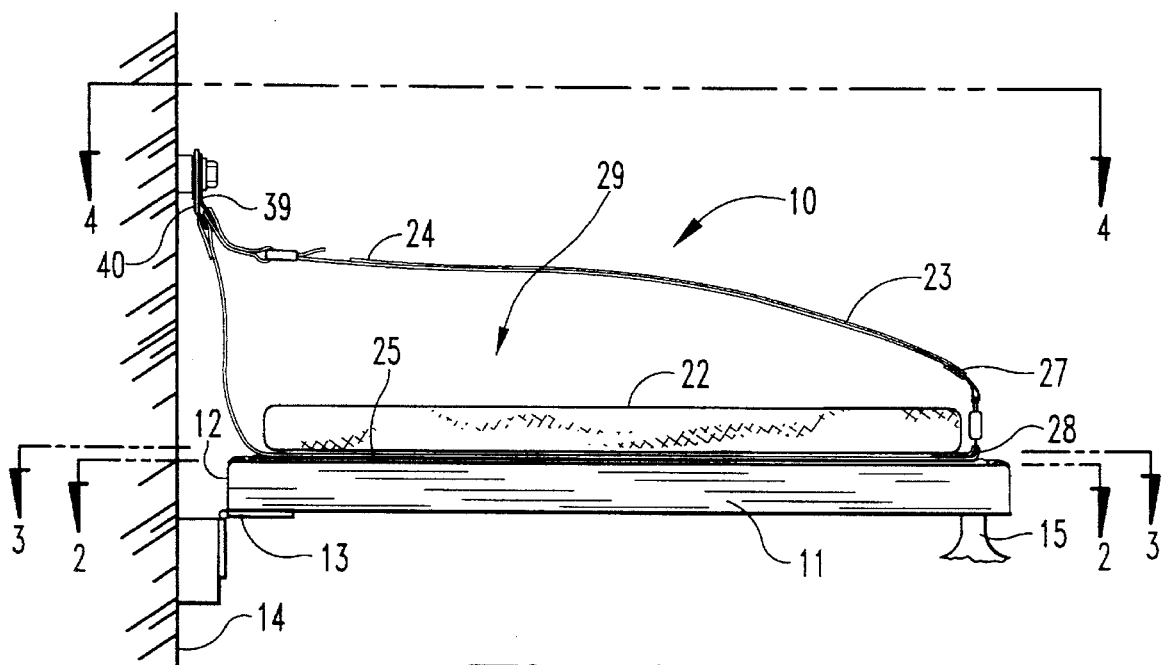
FIG. 1 is a side elevation of a bunk and restraint system incorporating our new invention.

For the purposes of promoting an understanding of the principles of the invention, reference will now be made to the embodiment illustrated in the drawings and specific language will be used to describe the stone. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
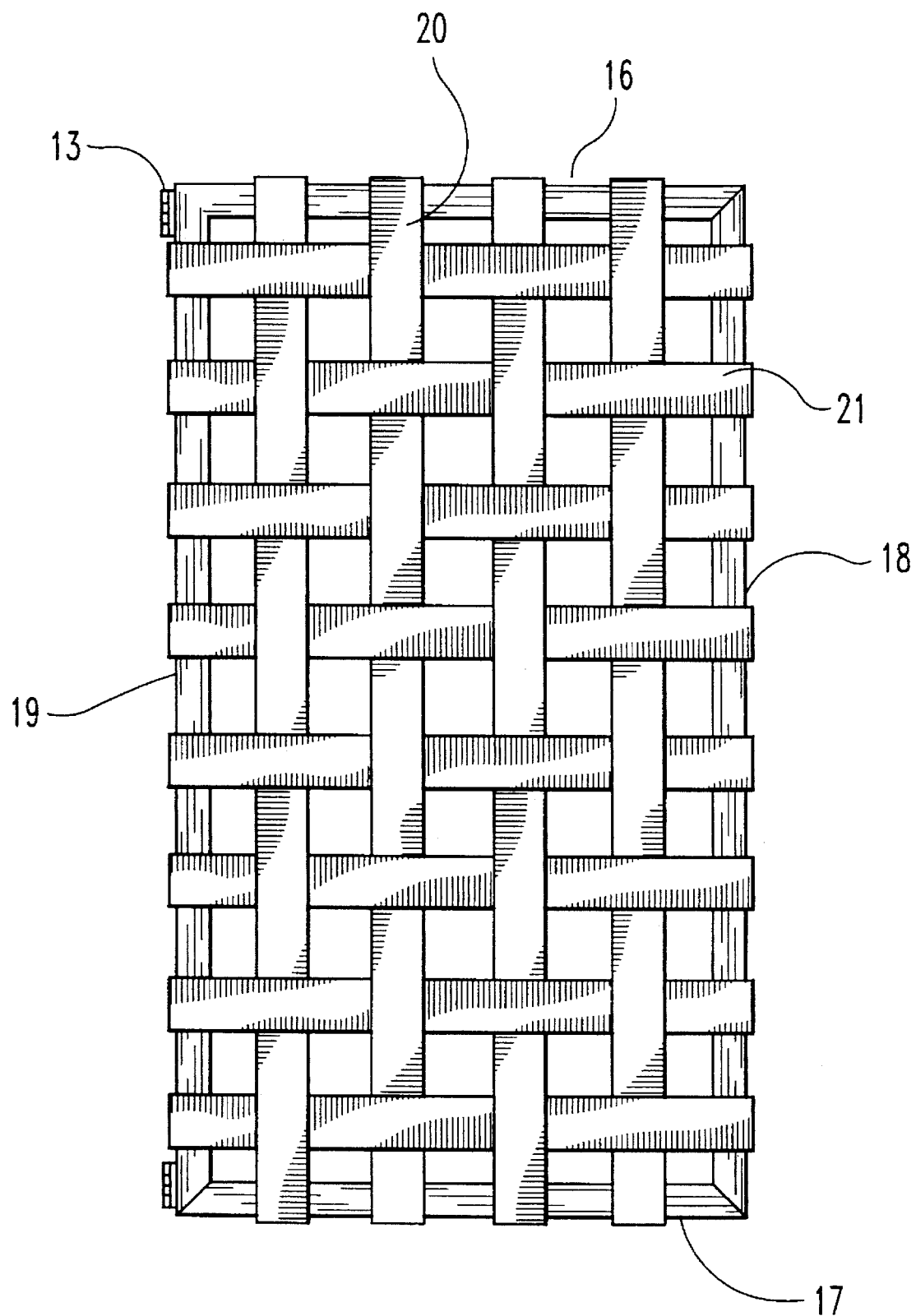
FIG. 2 is a cross-sectional view taken along the line 2—2 of FIG. 1 and viewed in the direction of the arrows.

Referring now more particularly to FIGS. 1 and 2, there is shown a bed 10 pivotally mounted to the back wall 14 of a sleeping compartment provided in a semi-trailer cab. Bed 10 includes a tubular frame 11 having a proximal end 12 mounted by conventional hinges 13 to back wall 14 enabling the bed to be pivoted upwardly against the back wall when not in use. A pair of stop surfaces 15 are mounted to the mutually facing side walls of the sleeping compartment and are positioned to support the bed when the bed is pivoted clockwise as viewed in FIG. 1 from the stored position to the in-use or horizontal position.

The bed includes a conventional bunk frame 11 consisting of a pair of longitudinally extending tubular elements 16 and 17 secured at their opposite ends to and between lateral tube elements 18 and 19. A plurality of laterally extending flexible webs 20 have their opposite ends fixedly secured to elements 16 and 17 and are interweaved with a plurality of flexible webs 21 which have their opposite ends fixedly mounted to tube elements 18 and 19. Flexible webs 20 and 21 thereby provide a support similar to bed springs to supportingly receive a mattress pad 22 which forms an occupant supporting means resting atop the webs. An optional design includes a fabric piece sewn around the bunk frame providing a supporting surface.

Restraint 23 includes a net 24 and a support 25 with net 24 extending over the occupant reclining atop mattress pad 22 and with support 25 extending between mattress pad 22 and bunk frame 11. The proximal ends 39 and 40 respectively of net 24 and support 25 are secured together and mounted to back wall 14 by conventional fastening devices with the proximal ends 39 and 40 being located above hinge 13. The distal ends 27 and 28 respectively of net 24 and support 25 are provided with interlocking means for securing the net and support together, thereby defining an enclosure 29 in which the mattress pad 22 and occupant reclining thereon are located.

Figure 3:
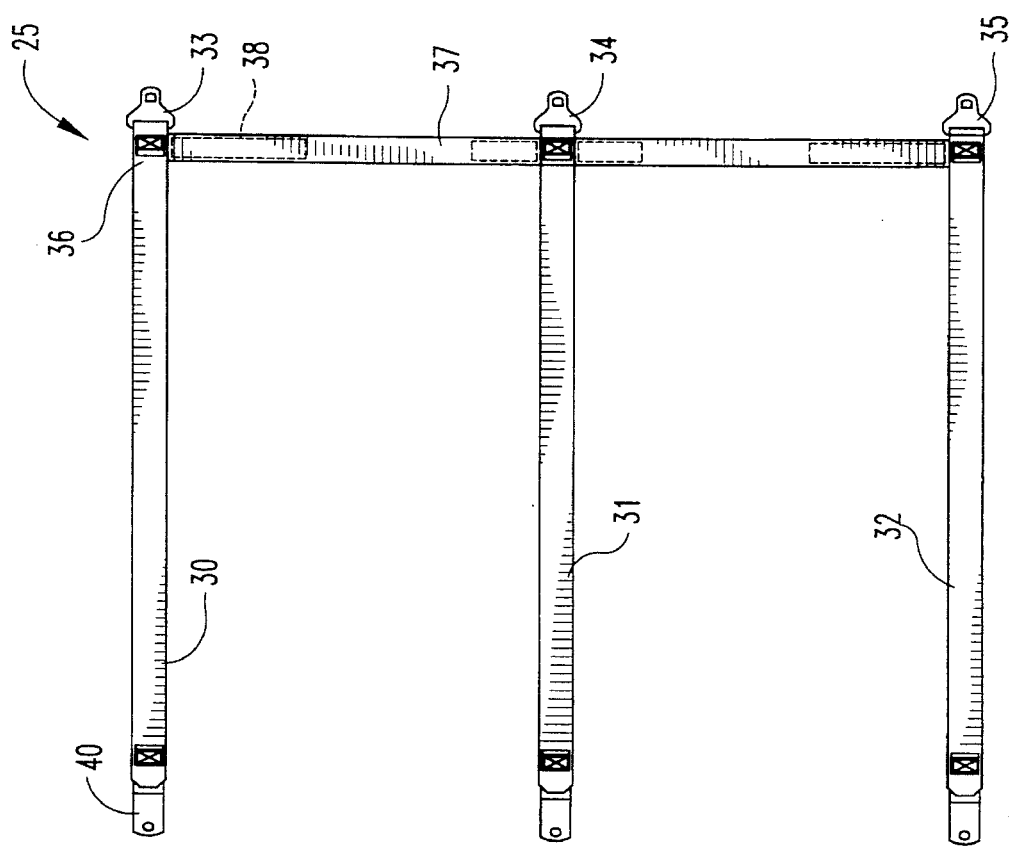
FIG. 3 is an enlarged cross-sectional view taken along the line 3—3 of FIG. 1 and viewed in the direction of the arrows.

Support 25 (FIG. 3) includes a plurality of flexible webs 30–32 each having a proximal end 40 fastened by conventional means to the proximal ends of the net as well as directly to back wall 14. The distal ends 36 of each web 30–32 are attached and stitched to a lateral web 37 extending therebetween. Conventional seat belt tongues 33, 34 and 35 are respectively mounted to the distal ends 36 of webs 30, 31 and 32. Strips 38 are positioned beneath and are mounted along the length of lateral web 37 so as to frictionally engage and lack to mating hook and loop strips mounted to and atop flexible webs 20 and 21. Thus, the forward most webs (FIG. 1) of flexible webs 20 and 21 are located beneath and attached to web 37 by means of strips 38. Tongues 33, 34 and 35 may then be pivoted upwardly to engage the seat belt buckles extending downwardly from net 24. Strips 38 do not transmit occupant inertial force to the bunk but instead locate and align the support and attached tongues for mating with the buckles.

Net 24 includes a plurality of web elements 42, 43 and 44 stitched and attached to lateral web elements 45 and 46 with mesh net 50 secured thereto. A plurality of seat belt buckles 47, 48 and 49 are mounted to net 24 and respectively engage seat belt tongues 33, 34 and 35. Net 24 is constructed with a plurality of bottom strength webs attached to a plurality of upper soft webs with mesh net 50 extending therebetween and attached thereto by means of stitching.

Figure 5:
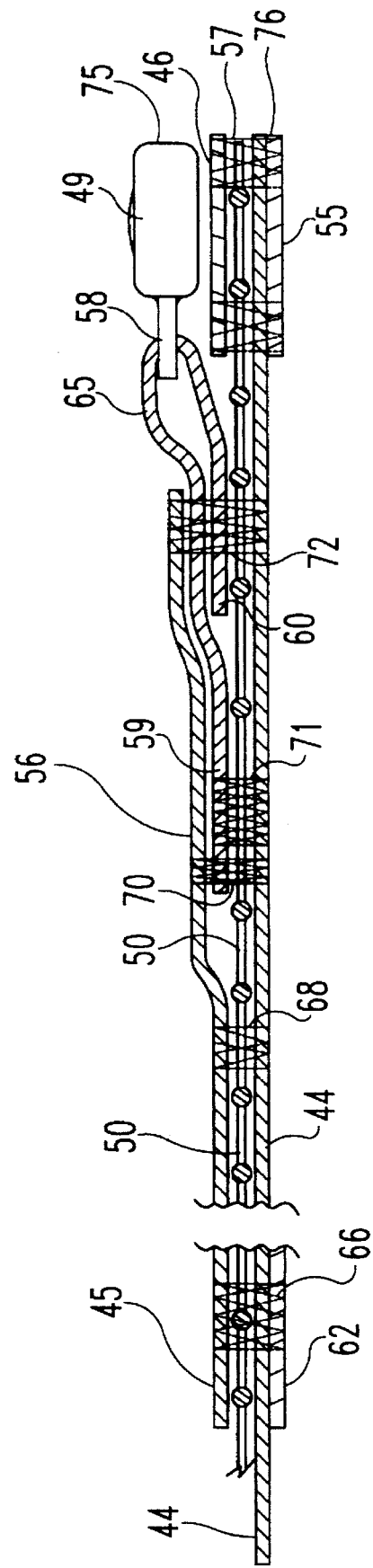
FIG. 5 is an enlarged fragmentary end view of the net distal end and buckle taken along the line 5—5 of FIG. 4 and viewed in the direction of the arrows.

The construction of web elements 44, 45 and 46 in relationship to seat belt buckle 49 will now be described it being understood that a similar description applies to the construction of web elements 42, 43, 45 and 46 in relationship to seat belt buckles 47 and 48. Longitudinally extending web elements 42, 43 and 44 are positioned atop laterally extending web elements 55 and 62 (FIG. 5) forming a frame work upon which mesh net 50 is supported. Web elements 42–44, 55 and 62 provide a plurality of bottom strength webs for supporting mesh net 50. The net further includes a plurality of upper soft webs 45, 46, 56, 63 and 64 positioned atop mesh net 50. Stitching 57 secures together upper soft web 46, mesh net 50, web elements 42, 43, 44 and lateral web 55. Likewise, stitching 66 secures together soft web 45, mesh net 50, web elements 42, 43, 44 and laterally extending web element 62. Three additional soft webs 56, 63 and 64 extending between soft webs 45 and 46 are positioned respectively atop web elements 44, 43 and 42 with mesh net 50 located therebetween and likewise are connected together by stitching. For example, stitching 68 secures together soft web 56, mesh net 50 and web 44.

A conventional seat belt buckle 49 has its main body restable atop soft web 46 and has a proximal end 58 through which web 65 extends. The opposite ends 59 and 60 of web 65 are positioned between soft web 56 and web 44 with stitching 70 securing webs 56 and 44 together along with web 65 and mesh net 50. Likewise, stitching 71 secures together the mesh net and proximal end 59 of web 65 and web 44. Last, stitching 72 secures together proximal end 60 to web 65. Notably, both proximal ends 59 and 60 of web 65 are located between soft web 56 and mesh net 50. Buckle 49 is positioned relative to the webs so that its distal edge 75 is flush with the distal ends 76 of webs 46, 44 and 55.

In order to utilize the restraint system disclosed herein, net 24 is pulled over the occupant reclining on the bed with buckles 47–49 being lockingly engaged with tongues 33–35 which are therefore operable to hold the net over and restrain the occupant reclining on the bed. At the same time, support 25 is held beneath and against the mattress pad 22 limiting movement of the mattress pad during an emergency stop. Support 25 limits occupant inertial force from being applied to the bunk frame 11 during an emergency stop. As the occupant moves horizontally forward during the emergency stop, the inertial force from the occupant will be applied directly to net 24 which, in turn, tensions both net 24 and support 25 thereby limiting application of the inertial force to the blink frame since the frame is not located between net 24 and support 25.

Figure 4:
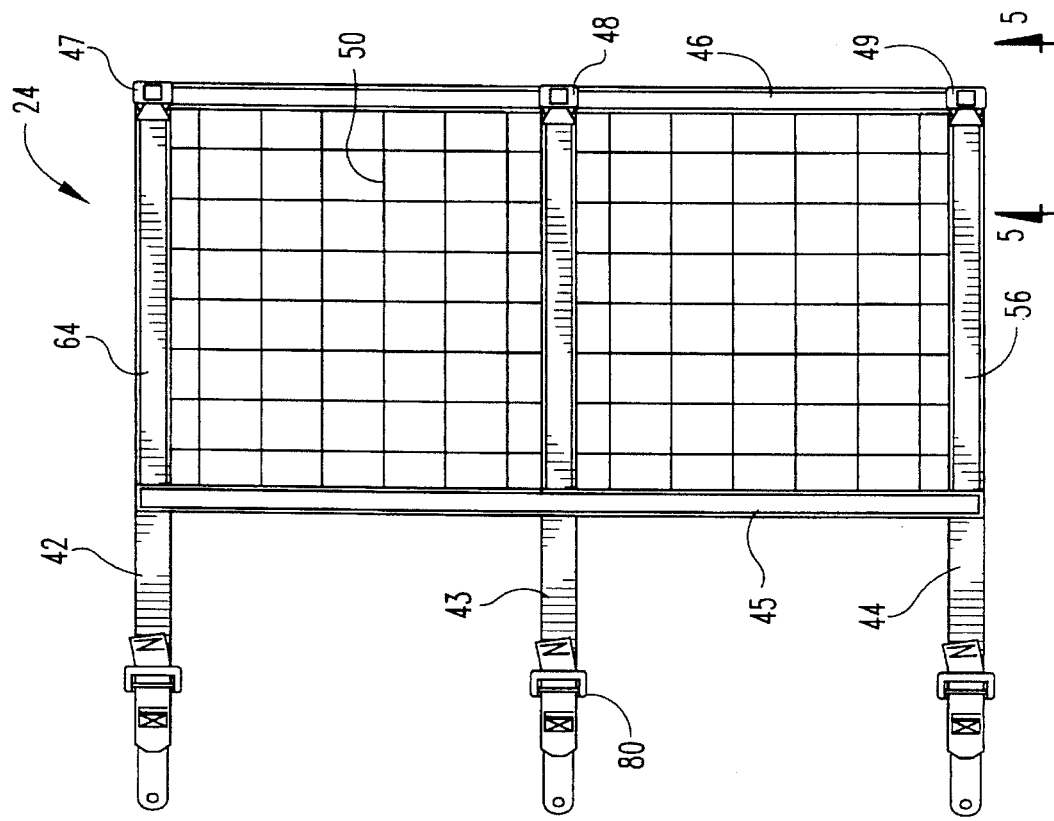
FIG. 4 is an enlarged cross-sectional view taken along the line 4—4 of FIG. 1 and viewed in the direction of the arrows.

Strips 38 are synthetic materials which adhere to mating strips mounted to webs 20 and 21 when pressed together and are available under the trademark (VELCRO). Strips 38 adhere to the mating strips on the forward most webs of webs 20 and 21 thereby positioning tongues 33–35 adjacent to the distal end of bunk frame 11 to receive the downwardly extending buckles 47–49. The tongues thereby anchor the buckles directly to support 25 without requiring further anchoring to the sleeping compartment floor. By positioning buckles atop soft web 46 and by locating the distal edge 75 (FIG. 5) of the buckle flush with the distal end 76 of the webs, the distal ends 76 of the webs of net 24 are positioned adjacent the distal end of support 25 thereby minimizing space therebetween preventing passage of the occupant through any gap existing between the net and support. Net 24 includes a plurality of webs generally in a rectangular configuration as shown in FIG. 4 defining a net perimeter extending over the mattress pad. Buckles 47–49 are mounted atop the web elements with the buckles being flush with the perimeter thereby not extending beyond the net. Notably, the buckles and tongues are located on the entrance side of the bunk thereby complying with industry recommendations.

Many variations are contemplated and included in the present invention. For example, a plurality of conventional adjustable buckles 80 are mounted to webs 42–44 (FIG. 4) adjacent the proximal ends of the webs to allow for adjustment of the length of the net. Other types of adjustment means may be incorporated into the net to allow for proper sizing. Likewise, the various webs may be attached together in a variety of configurations in addition to the configuration depicted in FIG. 5. In lieu of utilizing a mattress pad 22, a fabric sheet may be positioned atop support 25. Alternatively, support 25 may include webs in addition to webs 30–32 which are closer together forming a supporting surface for the occupant resting thereatop.

All compartments include a lower bunk which is fixedly mounted to the vehicle floor or pivotally mounted to the compartment back wall. Some compartments also include an upper bunk which is pivotally mounted to the back wall and may be swung up out of the way when not in use. Likewise, the bunk may be cantileveredly mounted to the back wall. The bunk is depicted in the drawings as being pivotally mounted to the back wall although it is to be understood that the present invention includes a restraint system wherein the bunk is fixedly and non-pivotally mounted.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A restraint system for a reclining occupant in a vehicle comprising:

bed means including a bunk with a bunk proximal end mounted to said vehicle and having a bunk distal end, said bed means further including occupant supporting means resting atop said bunk upon which said occupant may recline in a vehicle;

a net having a net proximal end mounted to the vehicle and further having a net distal end, said net extending from said net proximal end over said bed means to said net distal end;

a support having a support proximal end mounted to the vehicle and further having a support distal end, said support extending from said support proximal end between said bunk and said occupant supporting means to said support distal end;

first locking means mounted to said net distal end; and, second locking means mounted to said support distal end and releasably lockable with said first locking means and operable with said first locking means when locked together to hold said net over and restrain the occupant reclining on said bed means and to hold said support beneath and against said occupant supporting means limiting movement of said supporting means while limiting application of occupant inertial force to said bunk during an emergency stop.

2. The restraint system of claim wherein:

said second locking means when locked to said first locking means anchors said first locking means adjacent said bunk distal end.

3. The restraint system of claim 1 wherein:

said net includes a plurality of web elements attached together and said support includes a plurality of web members attached together with said first locking means positioned on said web elements positioning said net distal end adjacent said support distal end minimizing space therebetween while limiting passage of the occupant therebetween when said first locking means and said second locking means are locked together.

4. The restraint system of claim 3 wherein:

said net proximal end and said support proximal end are mounted together to said vehicle above said bunk proximal end and define an enclosure containing said occupant supporting means with said enclosure located entirely above said bunk.

5. The restraint system of claim 4 wherein:

said web elements and said web members are flexible elongated strips.

6. The restraint system of claim 5 wherein:

said web elements are connected together forming a perimeter for said net, said first locking means includes a buckle mounted atop said web elements with said buckle positioned flush with said perimeter.

7. The restraint system of claim 6 wherein:

said web elements include a plurality of bottom strength webs, a plurality of upper soft webs and a mesh construction located therebetween with said bottom strength webs and said upper soft webs stitched together holding said mesh construction firmly therebetween, said web elements further include a buckle web looped through said buckle with opposite end portions positioned between and stitched to said strength webs and said soft webs, said buckle movable apart from said web elements which further include a lateral web stitched to said strength webs with said buckle restable thereatop.

8. A restraint system for a reclining occupant in a vehicle comprising:

bed means upon which a occupant may recline in the vehicle, said bed means having a bed means proximal end movably mounted to said vehicle and having a bed means distal end;

net means having a net proximal end mounted to the vehicle and further having a net distal end, said net means extending from said net proximal end over said bed means to said net distal end;

support means having a support proximal end mounted to the vehicle and further having a support distal end, said support means extending from said support proximal end beneath at least a portion of said bed means to said support distal end;

first locking means mounted to said net distal end; and, second locking means mounted to said support distal end and releasably lockable with said first locking means and operable with said first locking means when locked together to hold said net means over and restrain the occupant reclining on said bed means and to hold said support means beneath and against said portion of said bed means limiting movement of said portion of said bed means while limiting application of occupant inertial force to said bed means during an emergency stop.

9. The restraint system of claim 8 wherein:

said net means includes a plurality of web elements attached together and said support means includes a plurality of web members attached together with said first locking means positioned on said web elements positioning said net distal end adjacent said support distal end minimizing space therebetween while limiting passage of the occupant therebetween when said first locking means and said second locking means are locked together.

10. The restraint system of claim 9 wherein:

said web elements include a plurality of bottom strength webs, a plurality of upper soft webs and a mesh construction located therebetween with said bottom strength webs and said upper soft webs stitched together holding said mesh construction firmly therebetween, said first locking means includes a buckle, said web elements further include a buckle web looped through said buckle with opposite end portions positioned between and stitched to said strength webs and said soft webs, said buckle movable apart from said web elements which further include a lateral web stitched to said strength webs with said buckle restable thereatop.

11. A restraint system for limiting movement of a occupant in a vehicle comprising:

a bunk in the vehicle;

a pad positioned atop said bunk;

a net having a net proximal end mounted to the vehicle and further having a net distal end, said net extending from said net proximal end over said bunk to said net distal end;

a support having a support proximal end mounted to the vehicle and further having a support distal end, said support extending from said support proximal end between said bunk and said pad to said support distal end;

first locking means mounted to said net distal end; and, second locking means mounted to said support distal end and releasably lockable with said first locking means and operable with said first locking means when locked together to hold said net over and restrain the occupant reclining on said pad and to hold said support beneath and against said pad limiting movement of said pad while limiting application of occupant inertial force to said bunk during an emergency stop.

12. The restraint system of claim 11 wherein:

said first locking means and said second locking means include mating and releasable interlocking buckles and tongues positioned on said net and said support.

13. The restraint system of claim 12 wherein:

said net includes a plurality of web elements attached together and said support includes a plurality of web members attached together with said buckles positioned on said web elements positioning said net distal end adjacent said support distal end minimizing space therebetween while limiting passage of the occupant therebetween when said buckles and tongues are locked together.

14. The restraint system of claim 13 wherein:

said web elements include a plurality of bottom strength webs, a plurality of upper soft webs and a mesh construction located therebetween with said bottom strength webs and said upper soft webs stitched together holding said mesh construction firmly therebetween, said web elements further include buckle webs looped through said buckles with opposite end portions positioned between and stitched to said strength webs and said soft webs, said buckles movable apart from said web elements which further include a lateral web stitched to said strength webs with said buckles restable thereatop.

* * * * *